United States Patent
Parkinson

(10) Patent No.: US 7,895,441 B2
(45) Date of Patent: Feb. 22, 2011

(54) LDAP GROUPING FOR DIGITAL SIGNATURE CREATION

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 917 days.

(21) Appl. No.: 11/756,553

(22) Filed: May 31, 2007

(65) Prior Publication Data

US 2008/0301769 A1 Dec. 4, 2008

(51) Int. Cl.
*H04L 29/06* (2006.01)
*H04L 9/32* (2006.01)
(52) U.S. Cl. .................. 713/176; 713/168; 713/150
(58) Field of Classification Search ............... 713/176, 713/168, 150
See application file for complete search history.

(56) References Cited

U.S. PATENT DOCUMENTS

| | | |
|---|---|---|
| 6,336,186 B1 | 1/2002 | Dyksterhouse et al. |
| 6,339,827 B1 | 1/2002 | Stokes et al. |
| 6,564,370 B1 | 5/2003 | Hunt |
| 6,581,093 B1 | 6/2003 | Verma |
| 6,751,797 B1 | 6/2004 | Desgranges et al. |
| 6,892,300 B2 | 5/2005 | Carroll et al. |
| 2003/0065921 A1 | 4/2003 | Chang |
| 2004/0064502 A1 | 4/2004 | Yellepeddy et al. |
| 2004/0064693 A1 | 4/2004 | Pabla et al. |
| 2005/0228886 A1 | 10/2005 | Cain et al. |

OTHER PUBLICATIONS

Entrust (Technical Integration Guide for Red Hat Directory Server 7.1 and Entrust Authority Security Manager 7.1, Entrust Authority Roaming Server 6.0 and Entrust Entelligence Desktop Manager 7.0 ; Jul. 2005 ).*
Knight (Managing Security with Group Policy and the Windows Server 2003 Group Policy Management Console Authored by: Norman Christopher-Knight Feb. 2003).*
Supporting Secure Embedded Access Control Policy with XACML+XML Security Hsieh, G.; Meeks, R.; Marvel, L.; Future Information Technology (FutureTech), 2010 5th International Conference on; Publication Year: 2010 , pp. 1-6.*
Server-aided digital signature protocol based on password; Yong-Zhong He; Chuan-Kun Wu; Deng-Guo Feng; Security Technology, 2005. CCST '05. 39th Annual 2005 International Carnahan Conference on; Publication Year: 2005 , pp. 89-92.*
Policy-Based Security Configuration Management, Application to Intrusion Detection and Prevention; Alsubhi, K.; Aib, I.; Francois, J.; Boutaba, R.; Communications, 2009. ICC '09. IEEE International Conference on; Publication Year: 2009 , pp. 1-6.*

(Continued)

*Primary Examiner*—David Y Jung
(74) *Attorney, Agent, or Firm*—Blakely, Sokoloff, Taylor & Zafman LLP

(57) ABSTRACT

A method and apparatus for grouping Light Weight Directory Access Protocol (LDAP) entries for signature generation. In one embodiment, the method includes grouping attributes of one or more repository entries to form a collection of values based on a pre-determined grouping policy. The method further includes generating a digital signature for the collection to authenticate any of the values in the collection.

18 Claims, 9 Drawing Sheets

OTHER PUBLICATIONS

Hassler, Vesna "X.500 and LDAP Security: A Comparative Overview," IEEE Network, vol. 13, No. 6, Nov./Dec. 1999, pp. 54-64.
Alonso, Jose Maria et al. "LDAP Injection Techniques," Communication Systems, 11th IEEE Singapore International Conference on, ICCS 2008, 2008, pp. 980-986.
Li, Xudong et al. "Research on LDAP Data Access Based on SDO," Computational Intelligence and Software Engineering, International Conference on, CiSE 2009, 2009, pp. 1-4.
U.S. Appl. No. 11/756,545, Notice of Allowance dated Sep. 8, 2010, 8 pages.

* cited by examiner

GENERATE SIGNATURES ON THE FLY

GENERATE SIGNATURES BY THE ATTRIBUTE AUTHORITY

US 7,895,441 B2

LDAP GROUPING FOR DIGITAL SIGNATURE CREATION

TECHNICAL FIELD

Embodiments of the present invention relate to Lightweight Directory Access Protocol (LDAP), and more specifically, to issuing an attribute certificate from an LDAP entry.

BACKGROUND

Light Weight Directory Access Protocol (LDAP) has become very popular due to its efficient and fast data access. A large number of applications/services are currently being developed which use an LDAP directory as their centralized data repository.

In the LDAP directory, data is stored as entries including key/value pairs. A key/value pair may consist of an attribute name and an attribute value. For example, an entry representing a person may include the textual string "telephoneNumber" as the attribute name and the numeric string "+1 800 123 4567" as the attribute value.

An LDAP directory can be queried to provide an attribute value of an LDAP entry. The attribute value is sometimes used to prove certain status of the entry. For example, the attributes of an LDAP entry for a person may include the person's social security number, driver license number, employee status, contact information, etc. Upon providing the values of these attributes, the person may be granted certain privileges, such as driving a rental car, access to an employer-sponsored facility, etc.

Conventional LDAP directories do not prove to a recipient that the attribute values sent to the recipient are authentic. The recipient is not provided with a means of verifying the authenticity of the received attribute values. Rather, the authenticity of the attribute values is implied from the fact that the values are received from a particular LDAP directory server. Relying on the data source, rather than the authenticity of the data itself, may sometimes be undesirable. For example, conventional LDAP techniques may be more susceptible to man-in-the-middle attacks and less adaptable to a network environment where proxy servers are used. Thus, there is a need to develop a secure and efficient technique for allowing a recipient to verify the authenticity of the attribute values returned from an LDAP directory.

BRIEF DESCRIPTION OF THE DRAWINGS

The present invention is illustrated by way of example, and not by way of limitation, in the figures of the accompanying drawings and in which.

DETAILED DESCRIPTION

Figure 1:
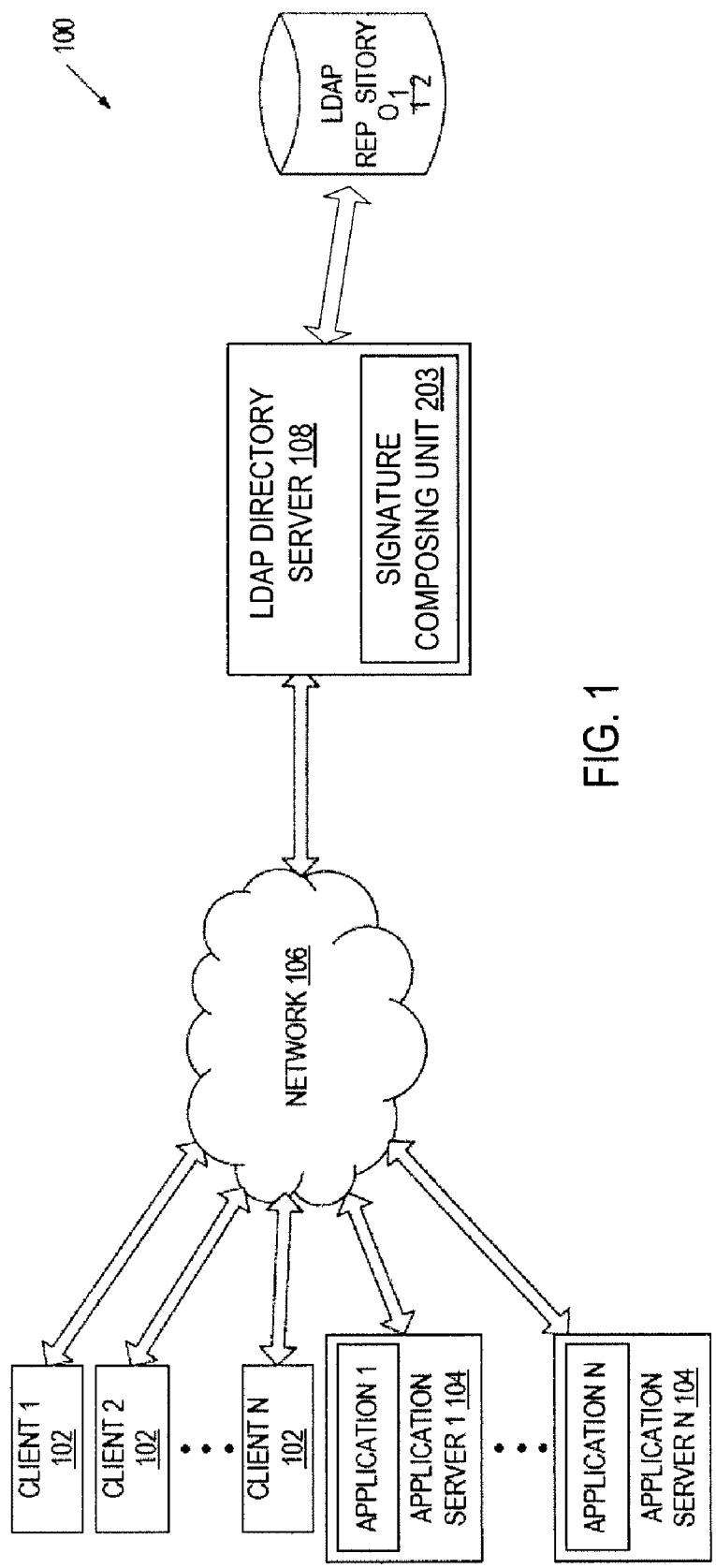
FIG. 1 illustrates a network architecture in which embodiments of the present invention may be implemented.

Described herein is a method and apparatus for grouping Light Weight Directory Access Protocol (LDAP) entries for signature generation. In one aspect, an LDAP directory server returns an attribute value in response to a request for an attribute of an LDAP entry. To establish the authenticity of the returned attribute value, the LDAP directory server transmits a digital certificate with the attribute value to a recipient. The certificate includes a signature, which can be verified by the recipient as authentic. The recipient may be someone who has the authority to grant certain privileges, or can forward the information to someone who grants the privileges, on the condition of submission of a verifiable attribute value. The signature may be generated on the fly upon receiving the request, or generated offline by an attribute authority and stored in a secure location. In another aspect, multiple attributes can be grouped in anticipation of a request according to a pre-determined grouping policy. Grouping the attributes reduces the number of signatures generated and the space required for storing the signatures.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "updating", "maintaining", "determining", "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates an exemplary network architecture 100 in which embodiments of the present invention may operate. The network architecture 100 may include client devices (clients) 102, an LDAP directory server 108 and a network 106. The clients 102 may be, for example, personal computers (PCs), mobile phones, palm-sized computing devices, personal digital assistants (PDAs), and the like.

The clients 102 are coupled to the LDAP directory server 108 via the network 106, which may be a public network (e.g., Internet) or a private network (e.g., Ethernet or a local area Network (LAN)). The LDAP directory server 108 may contain a server front-end responsible for network communications, plugins for server functions (such as access control and replication), a basic directory tree containing server-related data, and a database back-end plugin responsible for managing the storage and retrieval of LDAP repository data. In one embodiment, the LDAP directory server 108 includes a signature composing unit 203 for composing signatures for the attributes of LDAP repository data. The signature composing unit 203 will be described in greater detail with reference to FIGS. 2 and 3.

In one embodiment, the clients 102 communicate with the LDAP directory server 108 via a web server (not shown). For example, the clients 102 may host web browsers that communicate with the web server using HTTP to request information. The web server may then communicate with the LDAP directory server 108 using LDAP to retrieve requested information from an LDAP repository 112. Alternatively, the clients 102 may communicate directly with the LDAP directory server 108 using LDAP to request information stored in the LDAP repository 112.

The network architecture 100 may also include one or more application servers 104 that host various applications requesting information from the LDAP directory server 108. The application servers 104 operate as clients in communication with the LDAP directory server 108. Similarly to the clients 102, the application servers 104 may communicate with the LDAP directory server 108 directly or via a web server.

The LDAP repository 112 may be part of the LDAP directory server 108, or it may reside externally (e.g., on a database server). The LDAP repository 112 may contain a tree of data entries, each of which includes an attribute name and an attribute value. Attributes may be further specialized through subtypes. For example, "language" and "title" may be subtypes of the attribute "common name." When performing a search of the LDAP repository 112, a search request may specify the base attribute to retrieve data entries with all subtypes of this attribute or it may specify a certain subtype, in addition to the base attribute, to retrieve only data entries that match the specified subtype of the attribute.

Figure 2:
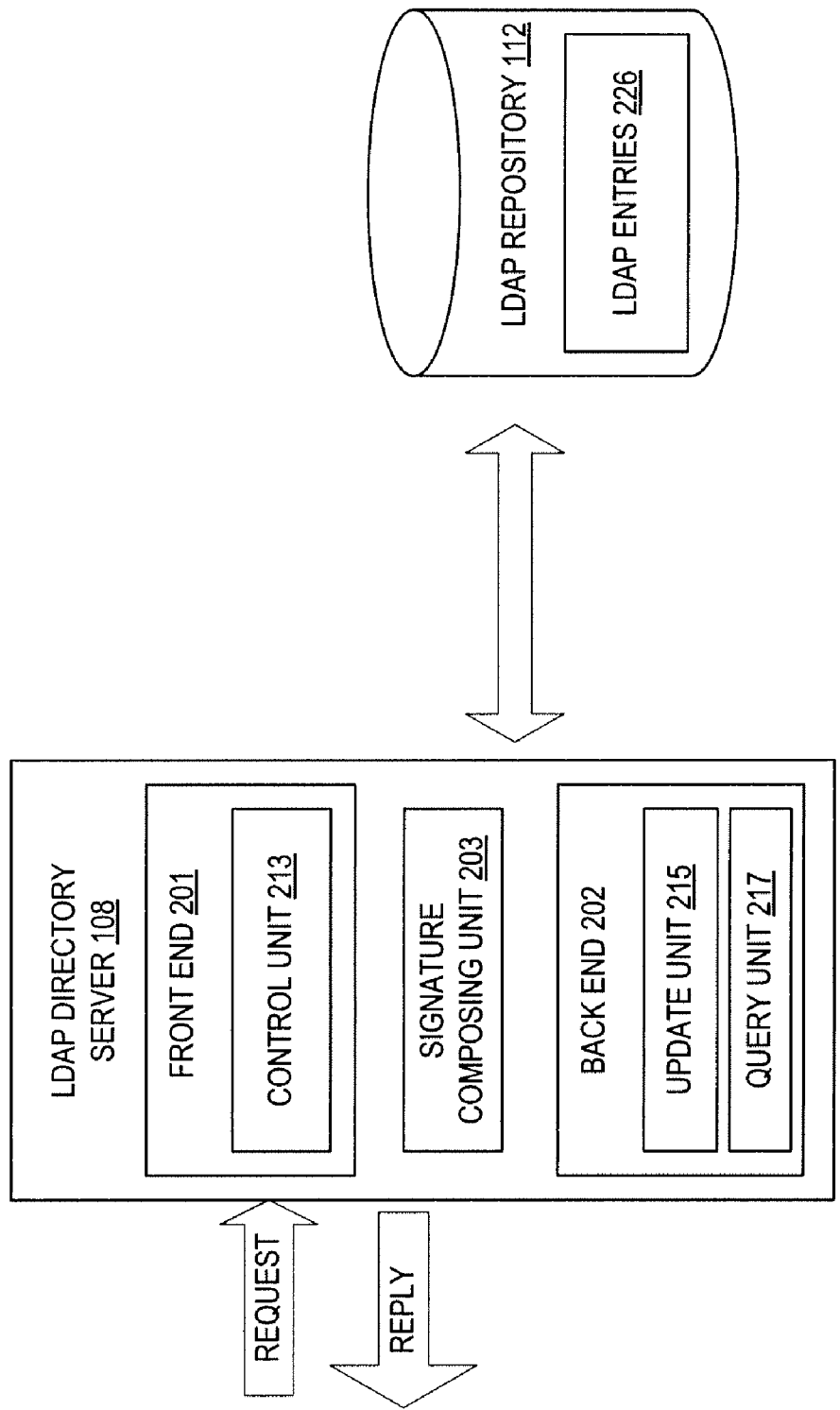
FIG. 2 is a block diagram of a Light Weight Directory Access Protocol (LDAP) directory server coupled to an LDAP repository for composing signatures for LDAP entries on the fly.

FIG. 2 illustrates an embodiment of the LDAP directory server 108 and the LDAP repository 112. The LDAP directory server 108 includes a front end 201 and a back end 202. The front end 201 uses a control unit 213 to determine the type of request (e.g., a search request or an update) and to identify the information to be retrieved if the request is a search request. For example, when a search request arrives at the front end 201, the control unit 213 parses the search request to identify the attributes of an LDAP entry 226 to be retrieved from the LDAP repository 112. In parsing the search request, the control unit 213 also determines whether an attribute certificate should be issued for the requested attributes. In one scenario, the LDAP directory server 108 may be configured to issue an attribute certificate for every search request that requests attributes. Alternatively, the search request may specifically request that an attribute certificate be issued to a particular requested attribute. In one embodiment, the request for the attribute certificate is indicated as a subtype of the requested attribute. In another embodiment, the request is embedded in a control message sent to the LDAP directory server 108.

For example, the search request for a person's social security number (SSN) may indicate that an attribute certificate for the SSN value is requested. The request for an attribute certificate for a particular attribute may be indicated in the subtype field of the attribute, such as "ssn; signature." Alternatively, the search request may specify the request for an attribute certificate in a control message attached to the search request. The control message is compliant with the LDAP protocol. In one embodiment, the control message is a numeric string indicating a request for an attribute certificate.

After the control unit 213 identifies the request type, the parsed information is passed to the back end 202. The back end 202 of the LDAP directory server 108 includes an update unit 215 to perform update operation to the LDAP entries 226, and a query unit 217 to perform query operations. The back end 202 is also coupled to the LDAP repository 112 for accessing the LDAP entries 226. The back end 202 is also coupled to the front end 201 to receive the parsed information from the control unit 213 and to return retrieved values to the front end network interface for transmitting a reply to the requester. In one embodiment, the reply may be in the form of a response control, which has the same format as the control message mentioned above, with the control value including the attribute certificate.

An attribute certificate includes a signature and additional information for a recipient to verify the signature. In one embodiment, the signature is generated on the fly by the signature composing unit 203 of the LDAP directory server 108. The signature composing unit 203 receives an attribute value retrieved from the LDAP repository 112, hashes and encrypts the attribute value to generate an encrypted signature. The encrypted signature is then sent with the attribute value to prove authenticity of the attribute value.

In another embodiment, the signature is generated offline and stored in a signature directory. Generating the signature offline typically reduces the query response time. However, stored signatures may be susceptible to malicious attacks. Thus, in one embodiment, write access to the stored signatures is restricted to ensure data integrity.

Figure 3:
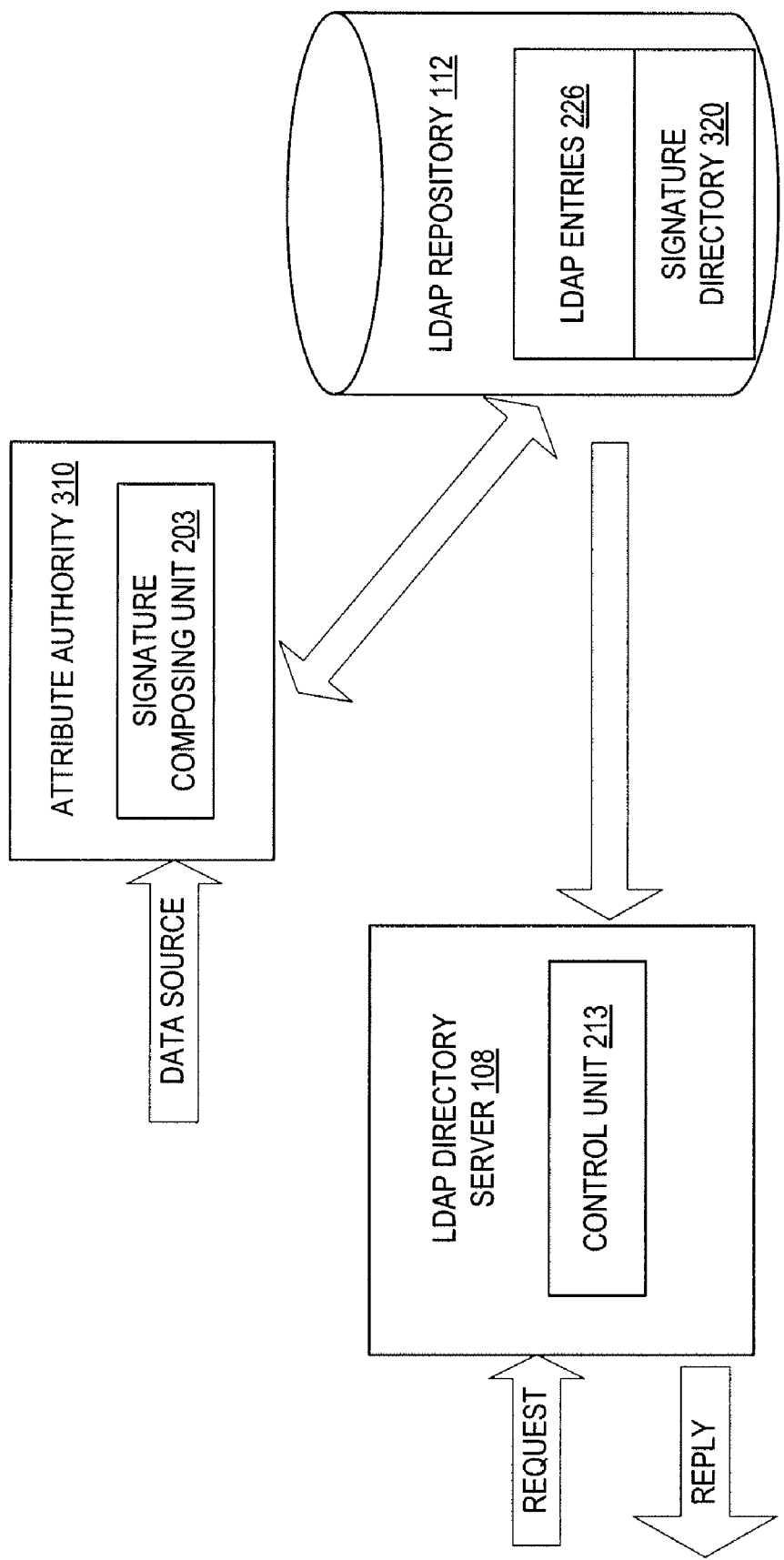
FIG. 3 is a block diagram of an attribute authority coupled to the LDAP directory server and the LDAP repository for composing signatures for LDAP entries offline.

FIG. 3 illustrates an embodiment of the LDAP repository 112 including a signature directory 320 for storing signatures generated offline. Signature directory 320 may include signatures and references to attributes for which those signatures are generated. Signature directory 320 may be, alternatively, stored in a storage device external to the LDAP repository 112. To protect the data integrity of the signatures, access to the signature directory 320 is restricted. In this embodiment, the signatures are generated by the signature composing unit 203 of an attribute authority 310, which is the only entity allowed to modify the contents of the signature directory 320. Other entities, such as the LDAP directory server 108, have read-only access to the signature directory 320.

The attribute authority 310 is responsible for receiving LDAP data from a data source, such as a human resource division, composing signatures for the received LDAP data, and storing the signatures in the signature directory 320. The attribute authority 310 may also read LDAP entries 226 from the LDAP repository 112 and compose signatures for attribute values in the LDAP entries 226. The LDAP directory server 108 is responsible for retrieving attribute values from the LDAP entries 226 and the corresponding signatures in response to a query.

Figure 4:
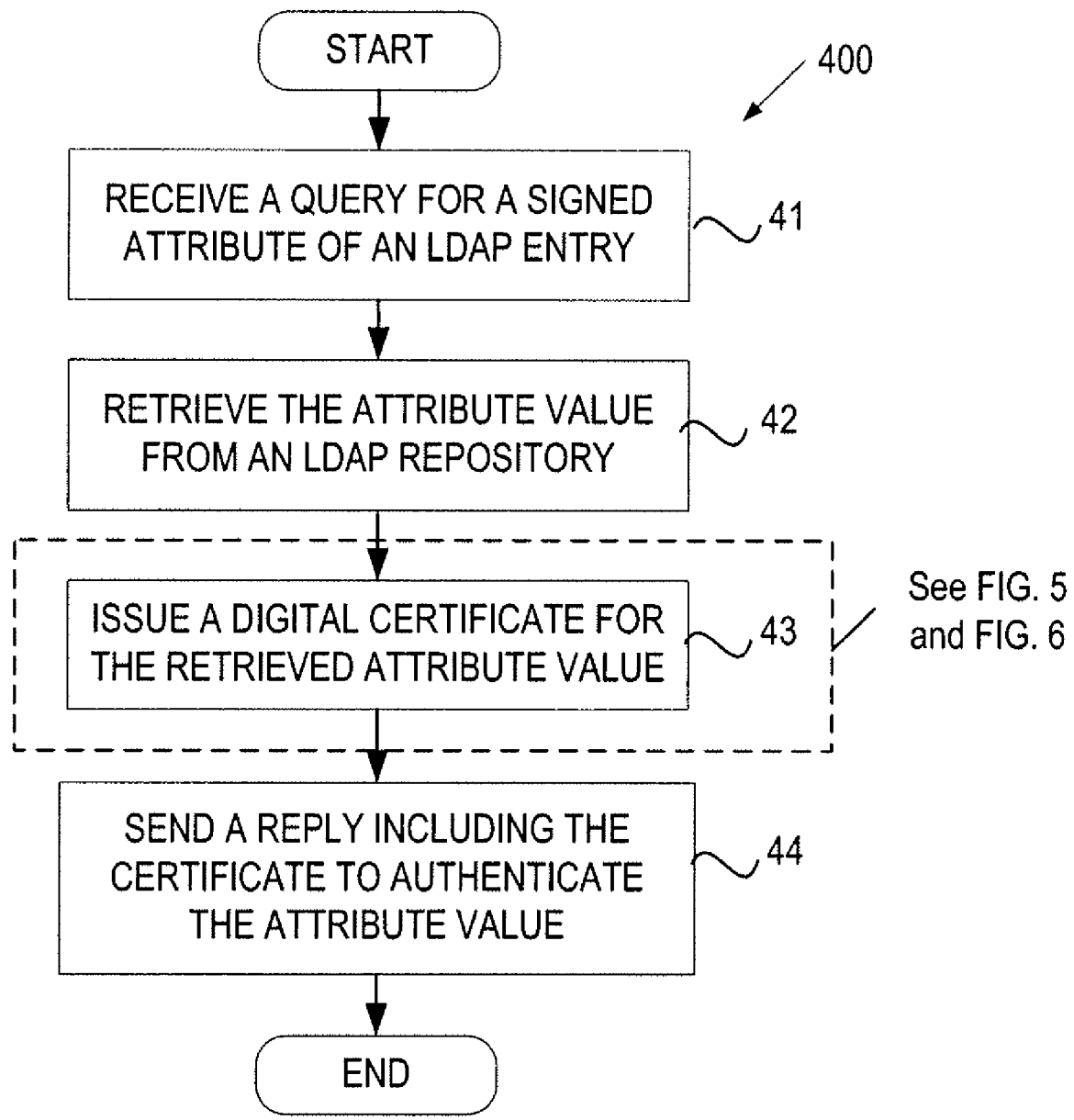
FIG. 4 is a flow diagram of one embodiment of a process that issues a digital certificate for an attribute of an LDAP entry.

FIG. 4 illustrates a flow diagram of one embodiment of a process 400 for processing a request for a signed attribute. The process 400 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 400 is performed by the LDAP directory server 108 of FIGS. 1-3.

Referring to FIG. 4, at block 41, the process 400 begins with the processing logic 926 receiving a query for a signed attribute of an LDAP entry. As mentioned above, the request for a signed attribute may be specified in the form of a subtype or in the control value field of a control message. In response to the query, at block 42, the processing logic 926 retrieves the requested attribute value from the LDAP repository 112. At block 43, the LDAP directory server 108 issues a digital certificate for the retrieved attribute value. The certificate includes the signature generated from the attribute value, as well as necessary information for a recipient of the signature to verify the authenticity of the signature. Details for signature generation and certificate issuance will be described in greater detail with reference to FIGS. 5 and 6. At block 44, the LDAP directory server 108 transmits the certificate and the requested attribute value to the recipient.

Figure 5:
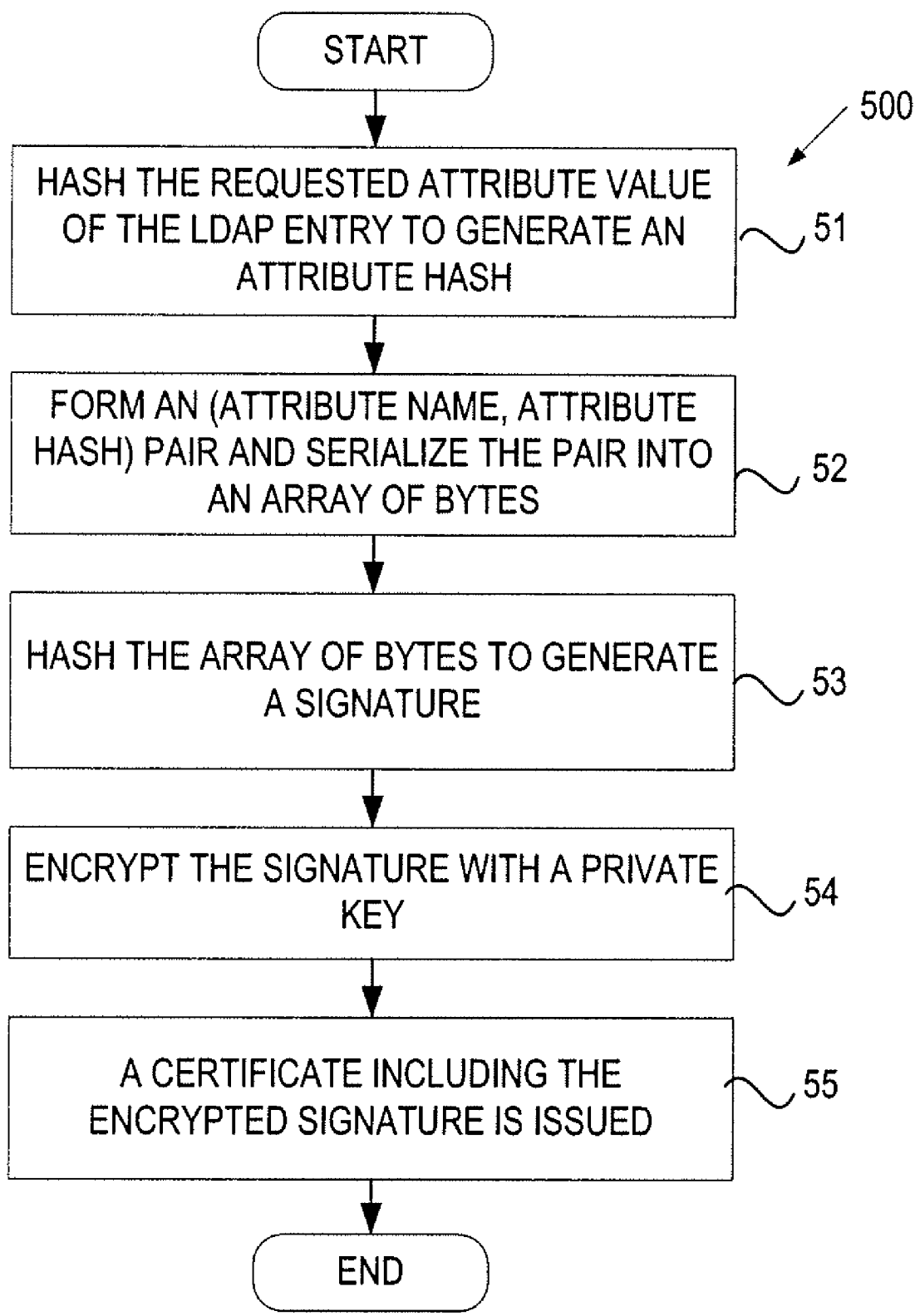
FIG. 5 is a flow diagram of one embodiment of a process that generates a signature for an attribute of an LDAP entry in response to a query.

FIG. 5 illustrates a flow diagram of one embodiment of a process 500 for providing a signature in response to a query that requests one or more attributes of an LDAP entry. The process 500 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 500 is performed by the signature composing unit 203 of FIG. 2, which typically generates a signature on the fly in response to a query. However, it is understood that the signature generated in accordance with the process 500 may also be stored in a storage device, e.g., signature directory 320, as described in the embodiment of FIG. 3 where signatures are generated offline by the attribute authority 310.

Referring to FIG. 5, at block 51, the process 500 begins with the processing logic 926 hashing an attribute value to generate an attribute hash. For example, the attribute values may be hashed by using a hash algorithm, e.g., SHA-1, SHA-2, message-digest algorithm 5 (MD5), or any other known hash algorithm. The chosen hash algorithm is also known to the recipient of the signature for the signature to be verified. At block 52, the processing logic 926 forms an (attribute name, attribute hash) pair, and serializes the pair into a sequence of bytes. The attribute name is the key (or identifier) for the attribute. For example, the attribute name for an LDAP personnel entry may include common name, telephone number, SSN, and the like. If the query requests multiple different attributes, the sequence of bytes will be formed by multiple (attribute name, attribute value) pairs, each pair for one requested attribute. At block 53, the sequence of bytes is hashed to generate a signature, using any known hash algorithm mentioned above. To associate the signature with the particular LDAP entry being queried, the sequence of bytes described above may further include the hashed value of an identifier of the LDAP entry (e.g., the distinguished name (dn)), such as hash(uid=jsmith, ou=engineering, o=red hat), where hash( ) indicates a hash function. At block 54, the signature is encrypted with a private key for transmission. At block 55, a certificate including the encrypted signature is transmitted with the requested attribute values to the recipient.

An example of a query using a control message to request an attribute certificate is described below. Assume that an LDAP entry is described by:

```
dn: uid = jsmith, ou = engineering, o = red hat
cn: john smith
telephoneNumber: 123 456 7890
employeeStatus: employee
citizenship: united kingdom
```

A query that requests an attribute certificate for the telephone number and citizenship of John Smith may have the format as follows:

```
filter: (uid = jsmith)
base: o = red hat
attributes: telephoneNumber citizenship
+control: attributeCertificate
```

An example of the response to the query includes a regular LDAP query response portion and an attribute certificate. The regular LDAP response portion includes:

```
dn: uid = jsmith, ou = engineering, o = red hat
telephoneNumber: 123 456 7890
citizenship: united kingdom
```

The attribute certificate, in the form of a control response, includes:

```
{
dn: hash(uid = jsmith, ou = engineering, o = red hat)
telephoneNumber: hash(123 456 7890)
citizenship: hash(united kingdom)
}
signature generated by signature composing unit 203.
```

The signature generated by process 500 can be easily verified by a recipient, e.g., the client 102 or the application server 104 of FIG. 1, as the signature is generated from the requested attribute values and a hash algorithm known to the recipient. The recipient may first decrypt the signature with a public key known to the recipient. Using the received attribute values, the recipient may repeat the operations of blocks 51-53 of process 500 to reproduce a signature. If the reproduced signature is the same as the received signature, the signature is verified. If not, the attribute value is discarded as invalid.

In some embodiments, a signature may be generated for a group of attributes in anticipation of a request. That is, attributes may be grouped according to a pre-determined grouping policy before the arrival of a query. This scenario typically occurs in the offline signature generation where space for storing the signature is considered. An attribute group, in this scenario, may contain more attributes than the ones requested by a query. This scenario is different from the one described in process 500 where only the requested attribute values are used to generate a signature. For example, an attribute certificate generated for a pre-determined attribute group may include the attributes of telephone number, citizenship and employee status. This attribute certificate may be used in response to a query that requests a subset of the attributes in the attribute group, e.g., telephone number and citizenship. Thus, in response to a query that requests an attribute certificate for the telephone number and citizenship of John Smith, the LDAP directory server 108 may transmit a reply having the format as follows:

The regular LDAP response portion:

```
dn: uid = jsmith, ou = engineering, o = red hat
telephoneNumber: 123 456 7890
citizenship: united kingdom
```

The attribute certificate:

```
{
dn: hash(uid = jsmith, ou = engineering, o = red hat)
telephoneNumber: hash(123 456 7890)
citizenship: hash(united kingdom)
employeeStatus: hash(employee)
}
signature composed by attribute authority 310.
```

In the scenario described above, the hash value of the employee status is included in the attribute certificate even though the query does not request it. The scenario is described in greater detail with reference to FIG. 6.

Figure 6:
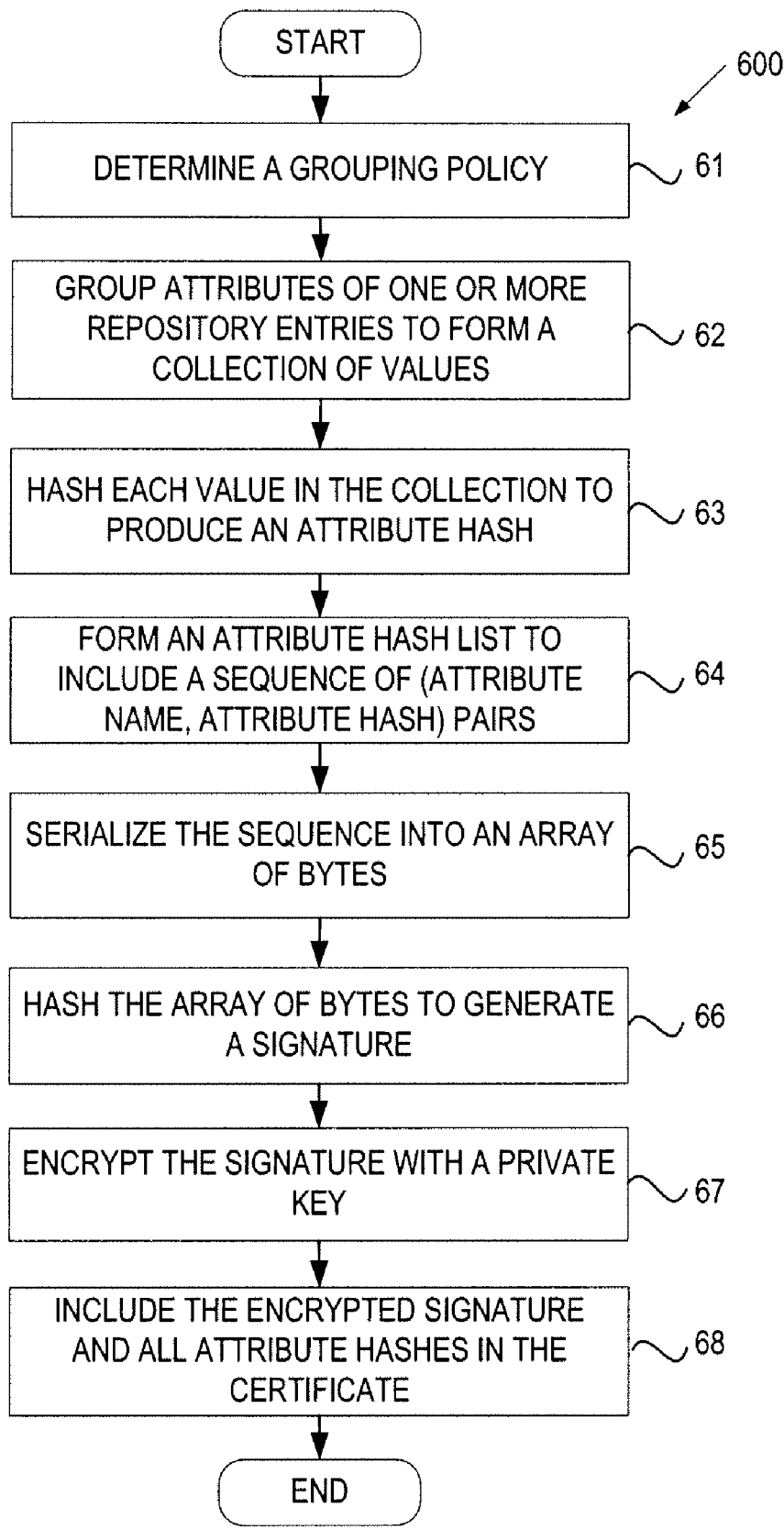
FIG. 6 is a flow diagram of one embodiment of a process that groups multiple attributes for signature generation according to a predetermined grouping policy.

FIG. 6 illustrates a flow diagram of one embodiment of a process 600 for generating a signature for a group of attributes. In response to a query requesting one or more attributes, the process 600 returns a signature to authenticate a pre-determined attribute group that contains the requested attributes. The process 600 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 600 is performed by the attribute authority 310 of FIG. 3.

Referring to FIG. 6, at block 61, the process 600 begins with the determination of a grouping policy. For example, the grouping policy may be based on a predicted usage pattern of the LDAP entries, such as the social security number of all salaried employees, contact information of each person, etc. According to the grouping policy, at block 62, attributes of one or more LDAP entries are grouped to form a collection of attribute values. At block 63, each attribute value is hashed to generate an attribute hash, and the attribute hash and its corresponding attribute name is paired to form an (attribute name, attribute hash) pair. At block 64, an attribute hash list is formed to include a sequence of the (attribute name, attribute hash) pairs generated from the collection of attribute values. At block 65, the sequence is serialized into an array of bytes. At block 66, the array of bytes is hashed to generate a signature. Similar to the process 500, the array of bytes may include the hashed values of one or more identifiers associated with the collection of attribute values (e.g., the distinguished names). At block 67, the signature is encrypted with a private key. At block 68, a certificate is formed by including the signature and the attribute hash list. The certificate may be stored in storage, e.g., the signature directory 320 of FIG. 3, and retrieved in response to a query requesting one or more attribute values in the group from which the signature is generated. The certificate is sent with the request attribute values to a recipient.

The recipient of the certificate generated by process 600, e.g., the client 102 or the application server 104 of FIG. 1, does not receive all the attribute values in the group from which a signature is generated. Instead, the recipient only receives the attribute values that he requests. Thus, the recipient cannot reproduce the signature by repeating the signature generation process 600. However, the information in the attribute hash list helps the recipient verify the signature. Although the recipient does not have all the attribute values from which the signature is generated, the recipient does have all the attribute hashes in the attribute hash list.

Figure 7:
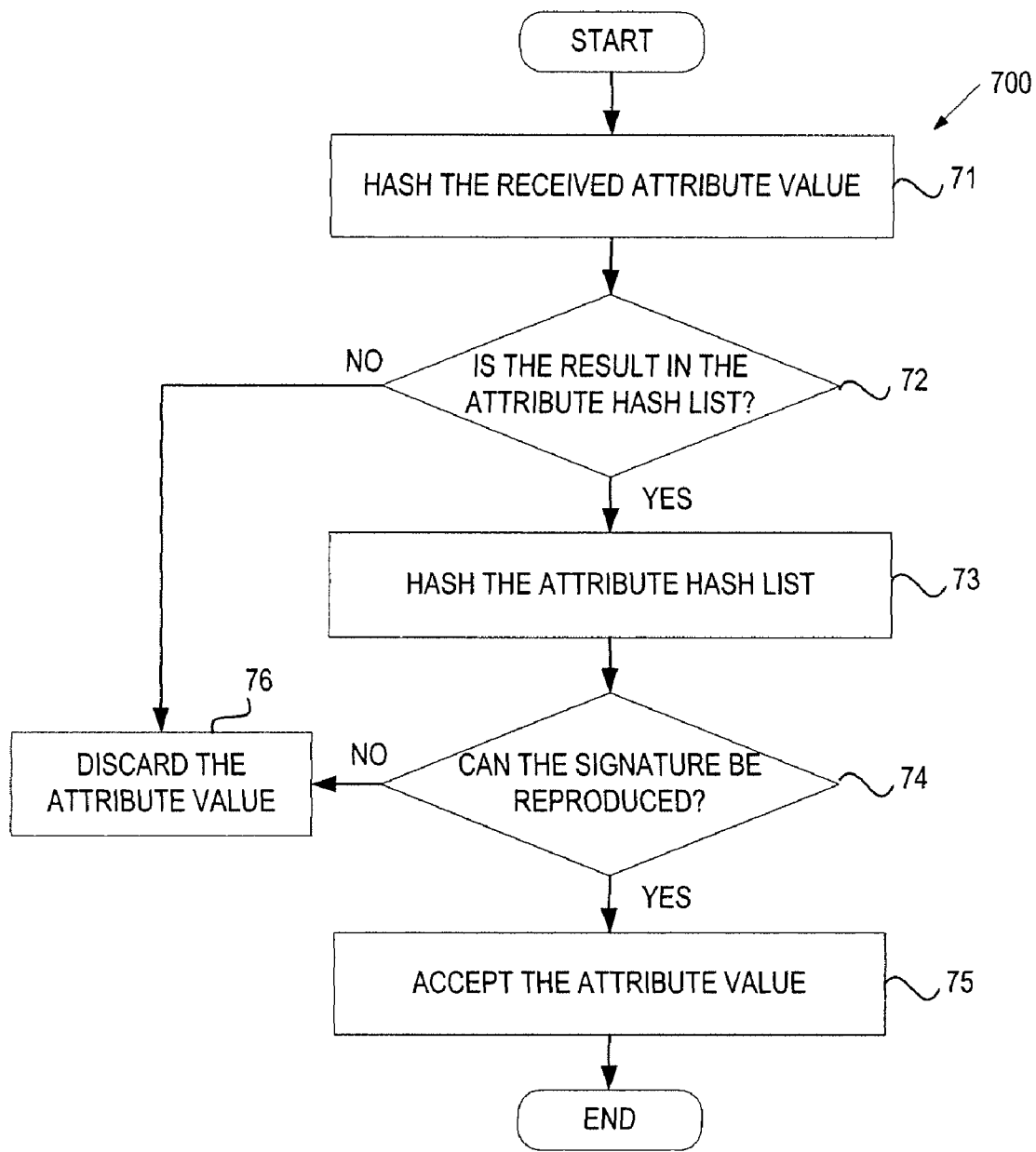
FIG. 7 is a flow diagram of one embodiment of a process that verifies the signature generated by the process of FIG. 6.

FIG. 7 illustrates a flow diagram of one embodiment of a process 700 for verifying a signature generated by the attribute authority 310 in accordance to the process 60 of FIG. 6. The process 700 may be performed by processing logic 926 of FIG. 9 that may comprise hardware (e.g., circuitry, dedicated logic, programmable logic, microcode, etc.), software (such as instructions run on a processing device), or a combination thereof. In one embodiment, the process 700 is performed by the client 102 or the application server 104 of FIG. 1.

Referring to FIG. 7, at block 71, the process 700 begins with the recipient hashing the received attribute value to verify that the result is in the received attribute hash list. If, at block 72, the result is not in the received attribute hash list, the attribute value is discarded as invalid at block 76. Otherwise, the attribute value is accepted at block 75. At block 73, the recipient verifies the received signature by hashing the received attribute hash list. If, at block 74, the recipient cannot reproduce the received signature from the attribute hash list, the received attribute value is discarded as invalid at block 76. Otherwise, the attribute value is accepted at block 75.

Figure 8:
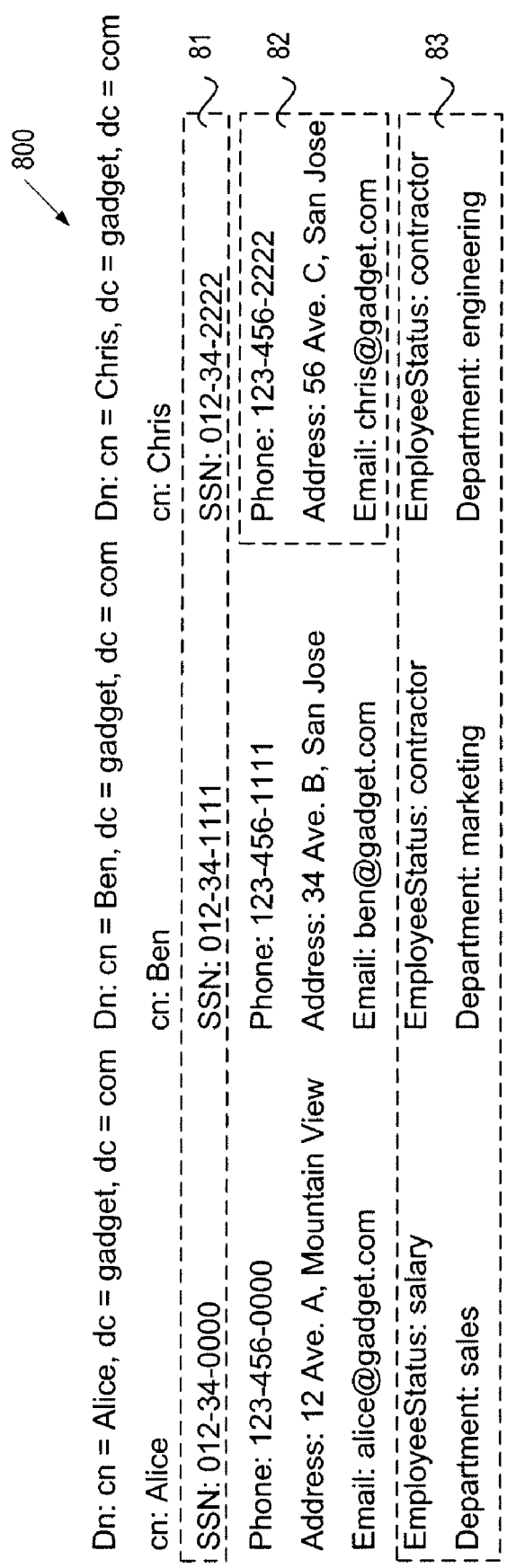
FIG. 8 illustrates an example of attribute grouping.

FIG. 8 illustrates a diagram showing an example of LDAP grouping. LDAP entries 800 of FIG. 8 include the data entries of three persons: Alice, Ben and Chris. Based on a pre-determined grouping policy, the social security numbers of the three people may form a first group 81, and a single signature may be generated for the first group 81. Further, the contact information (including telephone number, email address, and address) of each person may form a second group 82, and a single signature may be generated for the second group 82. Additionally, the employment-related information (including employment status and department) of the one or more people may form a third group 83, and a single signature may be generated for the third group 83. The signatures for each group 81, 82 and 83 may be generated according to the process 600 described above. Other grouping policies based on different criteria may also be used.

Figure 9:
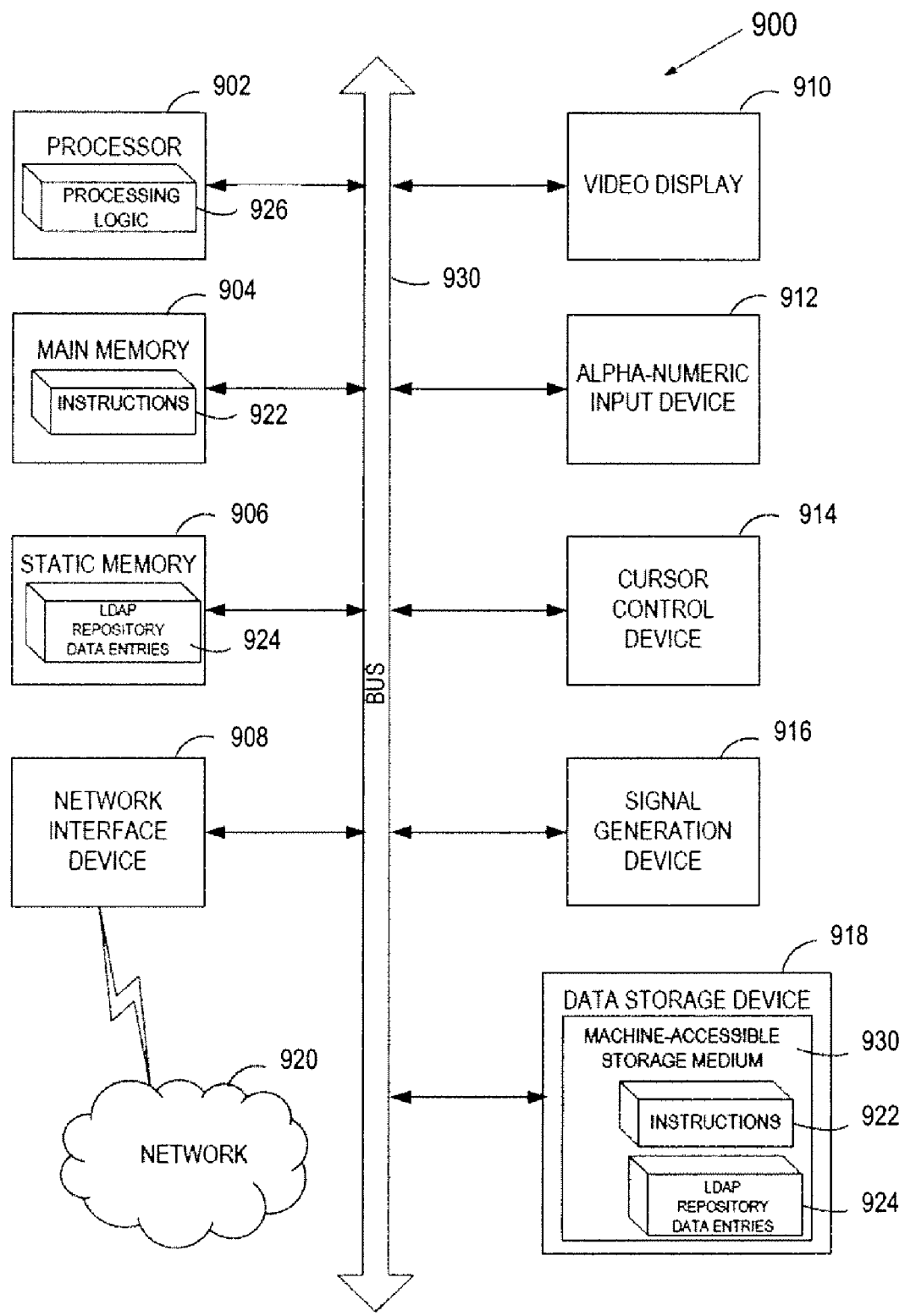
FIG. 9 illustrates a block diagram of an exemplary computer system implementing some embodiments of the present invention.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a machine-accessible storage medium 930 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-accessible storage media. The software 922 may further be transmitted or received over a network 920 via the network interface device 908.

The machine-accessible storage medium 930 may also be used to store the LDAP repository data entries 924. The LDAP repository data entries 924 may also be stored in other sections of computer system 900, such as static memory 906. The signature directory 320 of FIG. 3 may also be stored in a protected section of the storage medium 930 and/or the static memory 906 such that it is read-only to any entity other than the attribute authority 310 of FIG. 3.

While the machine-accessible storage medium 930 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for grouping LDAP entries for signature generation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    grouping attributes of one or more repository entries to form a collection of values corresponding to the attributes based on a pre-determined grouping policy;
    hashing each value in the collection of values to generate an attribute hash corresponding to each attribute;
    paring each attribute hash with a corresponding identifier to form an attribute pair corresponding to each attribute; and
    hashing each attribute pair to generate a digital signature for the collection to authenticate any of the values in the collection.

2. The method of claim 1 wherein the repository entries include Lightweight Directory Access Protocol (LDAP) entries.

3. The method of claim 1 further comprising:
transmitting attribute hashes with the digital signature in response to a query that requests one or more of the values in the collection.

4. The method of claim 1 wherein grouping attributes further comprises:
forming a list including a sequence of attribute pairs, each attribute pair including one of the attribute hashes with a corresponding identifier; and
transmitting the list with the digital signature in response to a query that requests one or more of the values in the collection.

5. The method of claim 1 further comprising:
grouping attribute values associated with a single attribute name of the one or more repository entries to form the collection; and
generating a single signature for the collection.

6. The method of claim 1 further comprising:
grouping a plurality of attributes of a single LDAP entry to form the collection; and
generating a single signature for the collection.

7. The method of claim 1 further comprising:
generating the digital signature by an attribute authority; and
storing the digital signature in a directory that is read-only to any entity other than the attribute authority.

8. The method of claim 1 wherein the attributes are grouped according to predicted usage of the repository entries.

9. A system comprising:
a repository to store repository entries; and
an attribute authority coupled to the repository, the attribute authority configured to
group attributes of one or more repository entries to form a collection of values corresponding to the attributes according to a pre-determined grouping policy;
hash each value in the collection of values to generate an attribute hash corresponding to each attribute;
pair each attribute hash with a corresponding identifier to form an attribute pair corresponding to each attribute; and
hash each attribute pair to generate a digital signature for the collection to authenticate any of the values in the collection.

10. The system of claim 9 further comprising:
a directory to store the digital signature, the directory to be read-only to any entity other than the attribute authority.

11. The system of claim 9 wherein the attribute authority further comprises:
a signature composing unit to hash each value in the collection to produce the attribute hashes and hash the attribute hashes to generate the digital signature.

12. The system of claim 9 further comprising:
a Lightweight Directory Access Protocol (LDAP) server coupled to the repository to retrieve the digital signature in response to a query that requests at least one of the values in the collection.

13. The system of claim 9 wherein the repository entries include LDAP entries.

14. An article of manufacture, comprising:
a machine-accessible storage medium including data that, when accessed by a machine, cause the machine to perform a method comprising:
grouping attributes of one or more repository entries to form a collection of values corresponding to the attributes based on a pre-determined grouping policy;
hashing each value in the collection of values to generate an attribute hash corresponding to each attribute;
paring each attribute hash with a corresponding identifier to form an attribute pair corresponding to each attribute; and
hashing each attribute pair to generate a digital signature for the collection to authenticate any of the values in the collection.

15. The article of manufacture of claim 14 wherein the repository entries include Lightweight Directory Access Protocol (LDAP) entries.

16. The article of manufacture of claim 14 wherein the method further comprises:
transmitting attribute hashes with the digital signature in response to a query that requests one or more of the values in the collection.

17. The article of manufacture of claim 14 wherein the method further comprises:
grouping attribute values associated with a single attribute name of the one or more repository entries to form the collection; and
generating a single signature for the collection.

18. The article of manufacture of claim 14 wherein the method further comprises:
grouping a plurality of attributes of a single LDAP entry to form the collection; and
generating a single signature for the collection.

* * * * *